(12) United States Patent
Cromer et al.

(10) Patent No.: US 7,630,713 B2
(45) Date of Patent: Dec. 8, 2009

(54) APPARATUS, SYSTEM, AND METHOD FOR RAPID WIRELESS NETWORK ASSOCIATION

(75) Inventors: Daryl Carvis Cromer, Apex, NC (US); Philip John Jakes, Durham, NC (US); Howard Jeffrey Locker, Cary, NC (US); Randall Scott Springfield, Chapel Hill, NC (US)

(73) Assignee: Lenovo (Singapore) Pte Ltd., Singapore (SG)

( * ) Notice: Subject to any disclaimer, the term of this patent is extended or adjusted under 35 U.S.C. 154(b) by 110 days.

(21) Appl. No.: 11/061,674

(22) Filed: Feb. 18, 2005

(65) Prior Publication Data

US 2006/0189311 A1    Aug. 24, 2006

(51) Int. Cl.
*H04L 12/28* (2006.01)

(52) U.S. Cl. .............. 455/434; 455/41.2; 455/515; 370/329; 370/338

(58) Field of Classification Search .......... 455/434, 455/452.1, 426.2, 552.1, 41.2, 515; 370/329, 370/338
See application file for complete search history.

(56) References Cited

U.S. PATENT DOCUMENTS

| | | | |
|---|---|---|---|
| 6,374,109 B1 | | 4/2002 | Shaheen |
| 6,389,273 B1 * | | 5/2002 | Brandenburg ............... 455/296 |
| 6,553,060 B2 | | 4/2003 | Souissi |
| 6,768,721 B1 | | 7/2004 | Schmitz |
| 6,778,827 B1 * | | 8/2004 | Anderson et al. ........... 455/434 |
| 7,260,393 B2 * | | 8/2007 | Fnu et al. .................. 455/432.1 |
| 7,295,524 B1 * | | 11/2007 | Gray et al. .................. 370/254 |
| 2002/0003792 A1 | | 1/2002 | Schmidl et al. |
| 2002/0181417 A1 | | 12/2002 | Malhotra et al. |
| 2003/0054827 A1 | | 3/2003 | Schmidl et al. |
| 2003/0078037 A1 | | 4/2003 | Auckland et al. |
| 2004/0066759 A1 * | | 4/2004 | Molteni et al. .............. 370/329 |
| 2004/0102192 A1 * | | 5/2004 | Serceki ....................... 455/434 |
| 2004/0137905 A1 * | | 7/2004 | Jeong et al. ................. 455/450 |
| 2004/0156382 A1 | | 8/2004 | Jang |
| 2004/0248585 A1 * | | 12/2004 | Karacaoglu ............. 455/456.1 |
| 2005/0026610 A1 * | | 2/2005 | Backes et al. ............... 455/434 |
| 2005/0063334 A1 * | | 3/2005 | Fnu et al. .................... 370/329 |
| 2005/0070279 A1 * | | 3/2005 | Ginzburg et al. ........... 455/434 |

(Continued)

OTHER PUBLICATIONS

About I/Q Modulators and I/Q Demodulators, http://rf-components.globalspec.com/LearnMore/Telecommunications_Networking/RF_M, pp. 1-3, downloaded and printed on Jan. 10, 2005.

(Continued)

*Primary Examiner*—George Eng
*Assistant Examiner*—Brandon J Miller
(74) *Attorney, Agent, or Firm*—Kunzler & McKenzie (57) ABSTRACT

An apparatus, system, and method are disclosed for rapid wireless network association. The apparatus includes a logic unit containing a plurality of modules configured to functionally execute the necessary steps of conducting a preliminary full band search on a predefined frequency spectrum to identify the frequency of an active communication channel, investigate the availability of the active communication channels identified during the preliminary search, and associate with a wireless network device on the available active communication channel. These modules in the described embodiments include a search module, an investigation module, and an association module. Beneficially such an apparatus, system, and method provide for more efficient searching, scanning, and association than typically found in wireless networks.

21 Claims, 8 Drawing Sheets

U.S. PATENT DOCUMENTS

| | | | |
|---|---|---|---|
| 2005/0153736 A1* | 7/2005 | Ganton .................... | 455/553.1 |
| 2005/0176420 A1* | 8/2005 | Graves et al. ............... | 455/424 |
| 2005/0215266 A1* | 9/2005 | Tsien et al. ................ | 455/454 |
| 2005/0272436 A1* | 12/2005 | Trott et al. ................. | 455/450 |
| 2006/0046737 A1* | 3/2006 | Douglas et al. .......... | 455/452.2 |
| 2006/0068775 A1* | 3/2006 | Wu et al. ................ | 455/426.2 |
| 2006/0203784 A1* | 9/2006 | Cromer et al. ............. | 370/338 |

OTHER PUBLICATIONS

I/Q Modulators and I/Q Demodulators Specifications, http://rf-components.globalspec.com/specifications/Telecommunications_Networking/R, p. 1-6, downloaded and printed on Jan. 10, 2005.

System Block diagrams Wireless LAN Card, http://focus.ti.com/vf/docs/blockdiagram.tsp?family=vf&vlockDiagramId=2019, pp. 1-2, downloaded and printed on Jan. 10, 2005.

Marshall Brain, "How WiDi Works," http://computer.howstuffworks.com/wireless-network.htm/printable, pp. 1-5, downloaded and printed on Jan. 10, 2005.

Larry Mittag, guide to IEEE 802.11 Wireless Lan Standards, htttp;//www.austinwireless.net/cgi-bin/index.cgi/Whats Wifi, pp. 1-7, downloaded and printed on Jan. 10, 2005.

The iLads Wireless Security Team, "What's wrong with WEP," http://www.nwfusion.com/research/2002/0909wepprimer.html, p. 1-7, downloaded and printed on Jan. 10, 2005.

Marshall Brain, "How Radio Works," http://electronics.howstuddwordks.com/radio.htm/printable, p. 1-12, downloaded and printed on Jan. 10, 2005.

Curt Franklin, "How Routers Work," http://computer.howstuffworks.com/router.htm/printable, p. 1-11, downloaded and printed on Jan. 10, 2005.

Why Choose?, http;//www.links.com/edu/wirelessstandards.asp, p. 1-2, downloaded and printed on Jan. 10, 2005.

* cited by examiner

APPARATUS, SYSTEM, AND METHOD FOR RAPID WIRELESS NETWORK ASSOCIATION

BACKGROUND OF THE INVENTION

1. Field of the Invention

This invention relates to wireless networking and more particularly relates to rapid wireless network association.

2. Description of the Related Art

Wireless networking technology is rapidly overtaking standard hardwired networks. For example, five to ten years ago a Local Area Network (LAN) was typically hardwired. Today, Wireless Local Area Networks (WLANs), wireless "hotspots", and the like are becoming common place. WLAN technology is being implemented in home, office, school, and other environments. WLAN technology is popular because it is generally less expensive, more portable, and more easily installed and maintained than traditional wired networking infrastructure.

Wireless networks are typically configured as a peer to peer network, a client to access point network, or a multiple client/multiple access point network. Generally a Wireless Access Point (WAP) is a wireless transceiver with its associated control structure that interfaces a wired network infrastructure on one end and a wireless client on another end. WAPs are commonly referred to as Wireless routers, although a WAP does not necessarily need to be a packet routing device.

For example, a client may include a laptop with a wireless network card plugged into its Personal Computer Memory Card International Association (PCMCIA) or internal Mini-PCI or Mini-PCI Express interface slot. A WAP may be a packet routing device connected to a T-1 wired landline. The WAP generally includes one or more antennas which transmit a Radio Frequency (RF) signal to the client. The client typically responds with another RF signal, and a wireless network link can be established.

Various communication standards have been developed to regulate transmission power levels, frequencies, security, and interference. The generally accepted standards are defined by the Institute of Electrical and Electronics Engineers (IEEE) standards 802.11a, 802.11b, and 802.11g. Additional standards may be used such as the new IEEE 802.11n standard and others. Wireless networking infrastructure typically operates in accordance with one or more of these standards. For example some wireless cards operate on both the IEEE 802.11a and 802.11b standards. In this example, the wireless card is capable of communicating at either the 5 GHz band as specified by the 802.11a standard or at 2.4 GHz as specified by the 802.11b and 802.11g standards.

Typically each standard specifies a range of frequencies for operation broken up into multiple channels. For example, IEEE 802.11b specifies operation between 2.402 GHz and 2.472 GHz. This frequency range of operation is typically referred to as the frequency band of operation. For 802.11b and 802.11g, the frequency band is typically broken into up to fourteen overlapping 20 MHz channels. Under 802.11a, 20 MHz channels are also defined but they are spread over the 5 GHz UNII band, which divides into up to 27 different channels. In a typical system, a WAP will put out a signal referred to as a beacon on a predefined frequency channel. A client may scan channel by channel to detect the transmitted beacon. If a client detects a beacon from a WAP, the client will attempt to associate with the WAP. However, as the number of acceptable standards grows, and as wireless components become capable of handling data transmissions in accordance with multiple standards, the time required to scan more and more channels is greatly increasing initial network association times.

Figure 1:
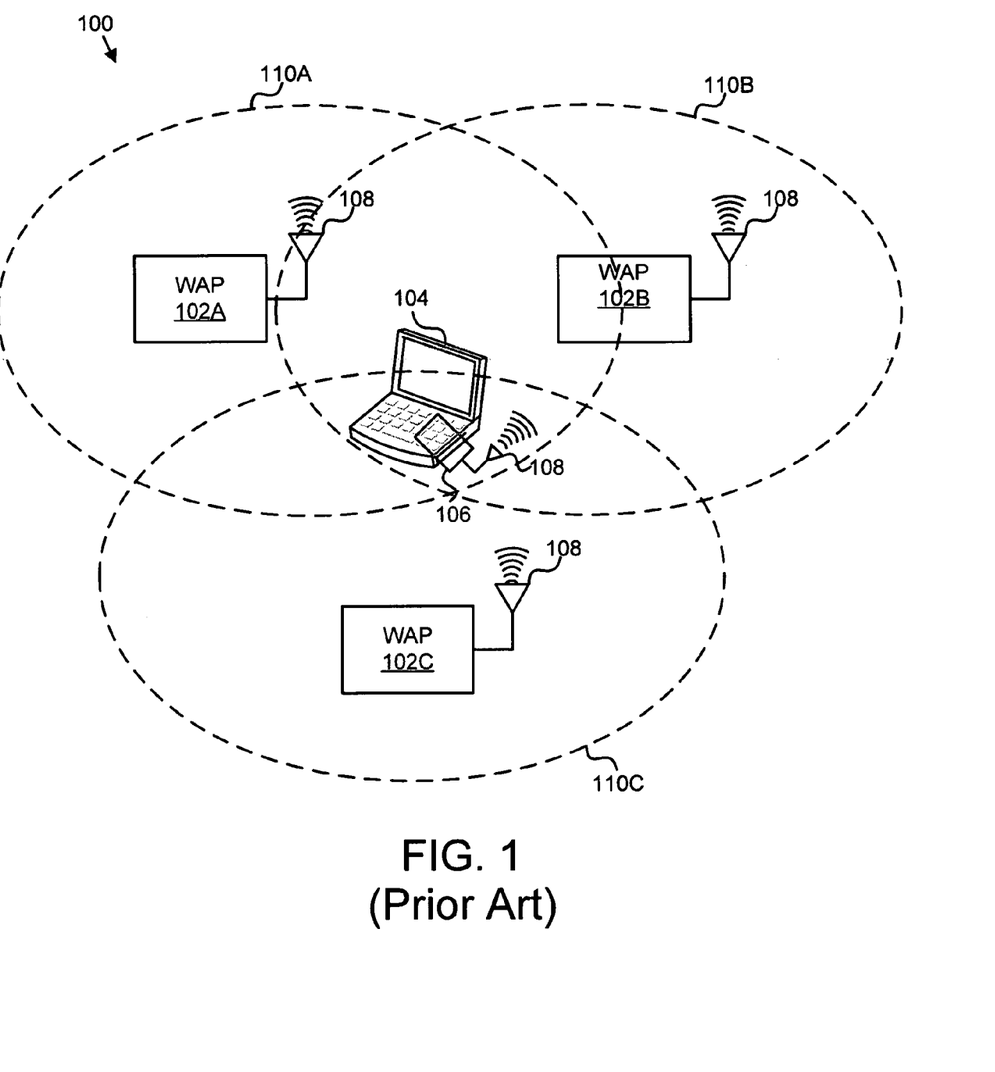
FIG. 1 is a schematic block diagram illustrating one embodiment of a typical wireless networking configuration.

In certain configurations, heterogeneous networks are formed when the RF radiation patterns of multiple WAPs overlap in the proximity of a client. For example, FIG. 1 is a schematic block diagram illustrating a typical WLAN network configuration of the prior art. The WLAN typically includes one or more WAPs 102. For illustrative purposes, assume that WAP 102A operates under the IEEE 802.11a standard, WAP 102B operates under the 802.11b standard, and WAP 102C operates under the 802.11g standard. The system also includes a client 104. In this example the client is a laptop computer coupled to a PCMCIA wireless networking card 106. Each WAP 102A-C and the wireless networking card 106 includes an attached RF antenna 108. In this example, the RF signals 110A-C representing the beacon transmitted by the antennas 108 on each of the WAPs 102A-C overlap in the proximity of the client 104. The frequency and power level of the signals 110A-C are determined in accordance with the associated networking standard IEEE 802.11a, b, or g.

If the wireless card 106 is capable of handling communications on any one of IEEE 802.11a, b, or g, then the wireless card may need to scan up to 50 separate channels to find an active network. Typically, the operation of passive channel scanning includes starting on the lowest channel of a given frequency band, scanning the channel for energy related to data communications or a WAP beacon, and then moving to the next channel if no energy is found. If a client capable of multiband communication cannot find an active channel in one band, it begins the scanning process on the first channel of the next frequency band. Each channel scan requires over two seconds; therefore the time to associate with a network may take minutes not seconds, which is an unacceptably long time by typical networking standards. By way of contrast, in wired networks IEEE standards require network association within 3 seconds total.

From the foregoing discussion, it should be apparent that a need exists for an apparatus, system, and method that rapidly associate with a wireless network. Beneficially, such an apparatus, system, and method would reduce the required scanning time associated with locating an active communication channel and associating with the active network.

SUMMARY OF THE INVENTION

The present invention has been developed in response to the present state of the art, and in particular, in response to the problems and needs in the art that have not yet been fully solved by currently available wireless networking equipment. Accordingly, the present invention has been developed to provide an apparatus, system, and method for rapid wireless network association that overcome many or all of the above-discussed shortcomings in the art.

The apparatus for rapid wireless network association is provided with a logic unit containing a plurality of modules configured to functionally execute the necessary steps of conducting a preliminary full band search on a predefined frequency spectrum to identify the frequency of an active communication channel, investigate the availability of the active communication channel identified during the preliminary full band search, and associate with a wireless network device on the available active communication channel. These modules in the described embodiments include a search module, an investigation module, and an association module.

In one embodiment, the search module is configured to conduct a preliminary full band search on a predefined frequency spectrum to identify the frequency of an active communication channel. The search module may additionally include a trigger module configured to trigger a broadband capture mode, such that the search module collects information that characterizes activity on the predefined frequency spectrum. Additionally, the search module may include a sequence module configured to sequentially search a plurality of predefined frequency spectra, the sequence determined by a predetermined priority policy. In one embodiment, the search module also includes an identification module configured to identify active communication channels characterized by a plurality of digital data networking standards and overlapping frequencies.

In one embodiment, the investigation module is configured to investigate the availability of the active communication channels identified during the preliminary search. Additionally, the investigation module may include a check module configured to check a communication channel identified as active by the search module for energy associated with a wireless access point. In one embodiment, the investigation module may also include an order module configured to sequentially order active communication channel candidates according to predefined criteria. In one embodiment, the investigation module may also include a determining module configured to determine a protocol supported by an active communication channel.

In one embodiment, the association module is configured to associate with a wireless network device on the available active communication channel. The association module may also include a previous access module configured to attempt association with a previously accessed wireless access point prior to attempting associations with any other wireless access points, wherein the attempt is made within a predetermined time interval. Additionally, the apparatus may include a convert module configured to convert the investigation module and the association module to standard scanning mode subsequent to a condition selected from a group consisting of successful wireless access point association and failure to associate with a wireless access point on communication channels identified by the search module.

A system of the present invention is also presented rapid wireless network association. In one embodiment the system includes a wireless access point configured for wireless network connections, and a wireless network client configured to enable operation according to promiscuous mode to conduct a preliminary full band search on a predefined frequency spectrum to identify the frequencies of an active communication channel, investigate the availability of the active communication channel identified during the preliminary search, and associate with a wireless access point on an available active communication channel.

A method of the present invention is also presented for rapid wireless network association. The method in the disclosed embodiments substantially includes the steps necessary to carry out the functions presented above with respect to the operation of the described apparatus and system.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a signal bearing medium may take a form capable of causing execution of a program of machine-readable instructions on a digital processing apparatus. A signal bearing medium may be embodied by a compact disc, digital-video disc, a magnetic tape, a Bernoulli drive, a magnetic disk, a punch card, flash memory, integrated circuits, or other digital processing apparatus memory device.

The schematic flow chart diagrams included are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 2:
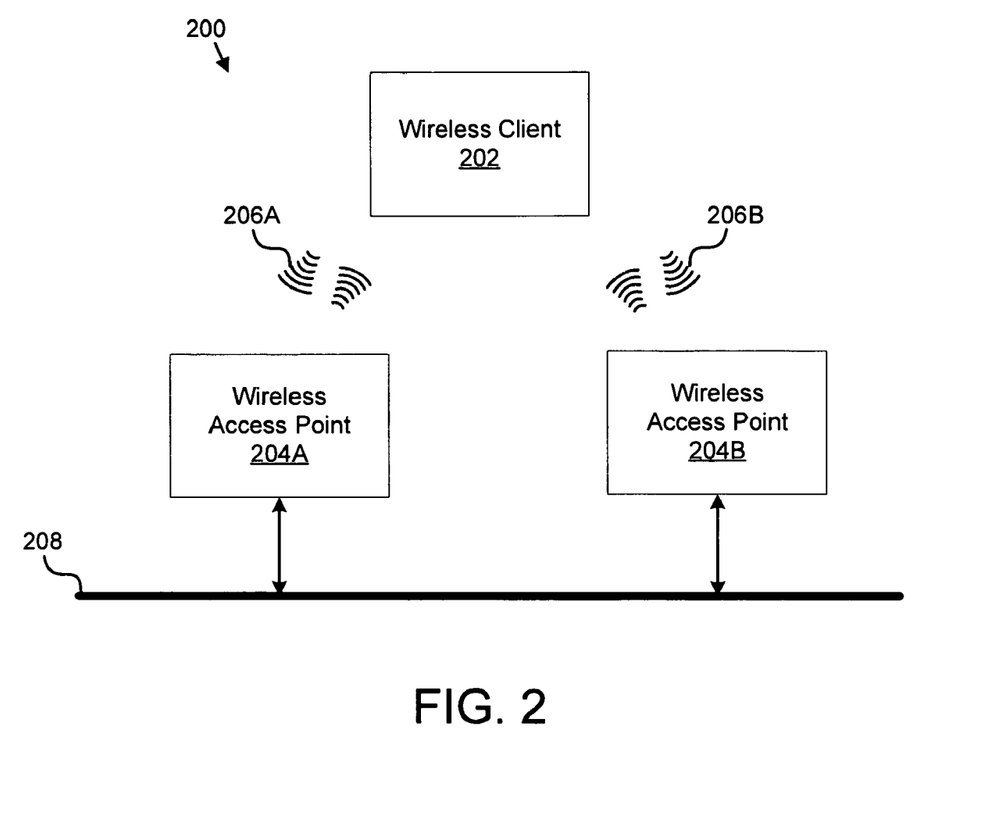
FIG. 2 is a schematic block diagram illustrating one embodiment of a system for rapid wireless network association.

FIG. 2 depicts a schematic block diagram illustrating one embodiment of a system 200 for rapid wireless network association. In one embodiment, the system 200 includes a wireless client 202, one or more Wireless Access Points (WAPs) 204, RF transmissions 206 between the wireless client and one or more WAPs 204 and a wired data connection 208 in physical communication with the WAP 204.

In one embodiment, the system 200 may include multiple WAPs 204A, B. In such an embodiment, the WAPs 204A, B may be configured to communicate data in accordance with either the same or different wireless networking standards. For example, WAP 204A may be configured to communicate data in accordance with IEEE 802.11a, and WAP 204B may be configured to communicate data in accordance with IEEE 802.11b. Alternatively, both WAPs 204A, B may be configured to communicate in accordance with the same IEEE standard. Although the WAPs 204A, B may typically be configured in accordance with one or more of the IEEE 802.11 standards, other embodiments may exist.

In one embodiment, the WAPs 204A, B transmit RF energy signals 206A, B respectively. The wireless client 202 may respond with a signal 206A, B. Consequently, a two way data communication link may be established between the client 202 and the WAPs 204A, B via RF signals 206A, B respectively. In one embodiment, the RF signal 206 propagates at a frequency in proximity to 2.4 GHz for 802.11b, g configurations. Alternatively the RF signal 206 may propagate at a frequency within the 5 GHz band for 802.11a configurations. In one embodiment, the RF signal may be modulated to carry data according to various modulation schemes. Such modulation schemes are commonly recognized by one of ordinary skill in the art of wireless data communications.

In one embodiment, the client 202 attempts to find and associate with a WAP 204 to establish a wireless network connection. In one embodiment, the client 202 may conduct a preliminary full band search on a predefined frequency spectrum to identify the frequencies of an active communication channel, investigate availability of the active communication channels identified during the preliminary search, and associate with the WAP 204 on an available active communication channel.

For example, the wireless client 202 may be configured to communicate in accordance with 802.11a, b, and g. Additionally, the client 202 may be configured to search the 5 GHz band associated with 802.11a before searching the 2.4 GHz band associated with 802.11b and g. The WAP 204A may be configured to communicate in accordance with 802.11a standards, and WAP 204B may be configured to communicate in accordance with 802.11g standards. In this example, the first WAP 204A may transmit a beacon signal 206A on channel 36 in the 5 GHz frequency band. The second WAP 204B may transmit a beacon 206B on channel 6 in the 2.4 GHz frequency band. The first and the second WAP 204A,B may be connected to a T-1 wired data connection 208.

In this example, the client 202 conducts a preliminary full band search of the entire 5 GHz band to identify the frequencies of signals 206A received by the client 202. During the search, the client 202 recognizes that there is 802.11a transmission on channel 36. After determining this is the only channel in the 5 GHz band with relevant transmissions, the client 202 investigates channel 36 directly, without having to scan each channel in the band. Client 202 quickly determines that the WAP 204A is transmitting a beacon signal on channel 36, and can attempt association. If the association is not possible, the client 202 would investigate other channels detected in the initial search, or in this case, the client 202 may then conduct a full band search of the 2.4 GHz band.

The client 202 may detect a beacon signal 206B transmitted by the second WAP 204B on channel 6 of the 2.4 GHz band. The client 202 then investigates on channel 6 directly, without scanning each channel of the 2.4 GHz band. If an association is possible, the client 202 then associates with the second WAP 204B. The client 202 and the WAP 204B then establish a wireless network connection in accordance with 802.11g standards, and the client 202 may gain access to the T-1 wired data connection 208.

Although the term Wireless Access Point (WAP) is often considered to be primarily a gateway connection between a wireless client and wired LAN resources, as used herein the term is not intended to be limited strictly to components including wired interfaces. The term wireless access point, as used herein, is intended to include any network component that can receive data, transmit data, or both wirelessly. For example, the system 200 does not necessarily need to include the wired network connection 208. In one embodiment, the first WAP 204A and the second WAP 204B may create an additional wireless network connection with each other. In such instances, a WAP 204 may act as both a wireless client 202 and a WAP 204. In such an embodiment, a peer to peer network may be established.

The wireless system 200 disclosed presents several benefits. First, the time required for network association is greatly reduced over standard systems of the art, because the preliminary full band scan eliminates the need to scan each and every channel. Second, the wireless system 200 presented may be more competitive with wired systems in terms of performance due to this reduced network association time. Finally, multiband wireless technology can be implemented more efficiently and reliably.

Figure 3:
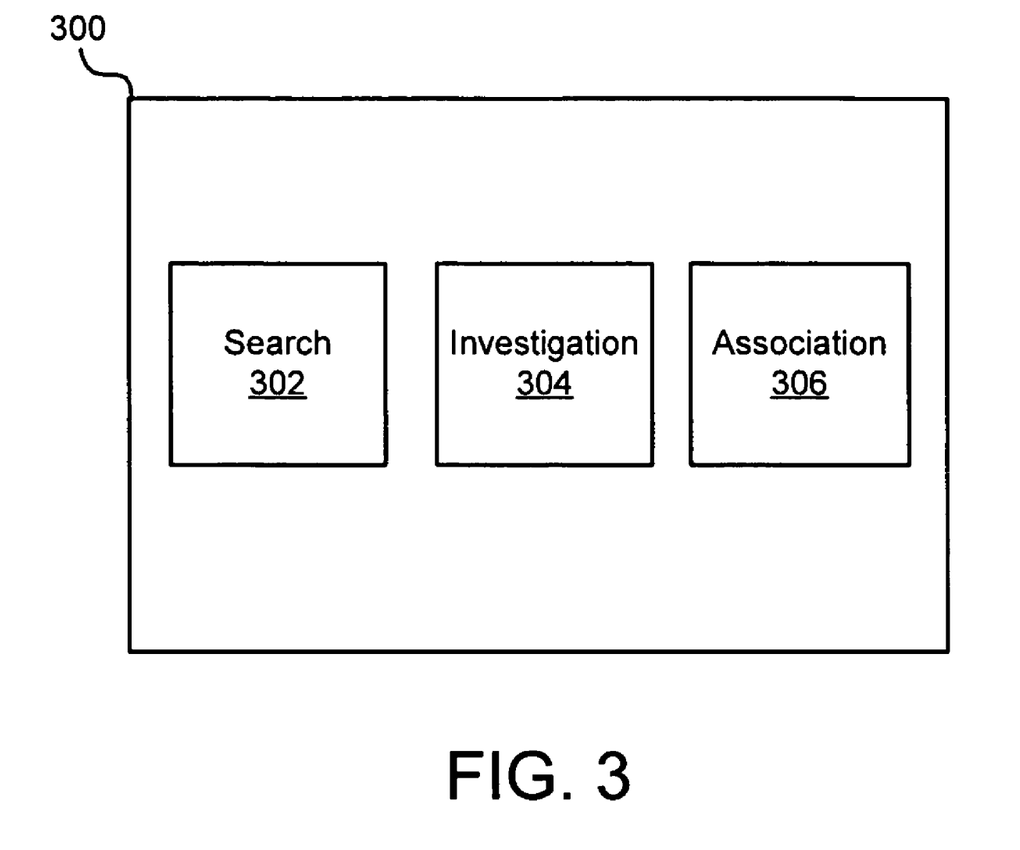
FIG. 3 is a schematic block diagram illustrating one embodiment of an apparatus for rapid wireless network association.

FIG. 3 is a schematic block diagram illustrating one embodiment of an apparatus 300 configured for rapid wireless network association. In one embodiment the apparatus 300 includes a search module 302, an investigation module 304, and an association module 306. These modules in their described embodiment, may be used to carry out the necessary steps of conducting a preliminary full band search on a predefined frequency spectrum to identify the frequencies of an active communication channel, investigate availability of the active communication channels identified during the preliminary search, and associating with the wireless access point on an active communication channel.

In one embodiment, the search module 302 conducts a preliminary full band search on a predefined frequency spectrum to identify the frequencies of an active communication channel. The term "full band search" as used herein refers to capturing information about energy received by a receiving antenna 108 simultaneously across multiple channels of a predefined frequency spectrum.

For example, the frequency spectrum defined for 802.11a may be from 5.15 GHz to 5.875 GHz. Alternatively, the frequency range may be broadened for compatibility with standards in other geographic locations. For example IEEE 802.11j corresponding to 4.90 GHz band in Japan, or the 802.11h standard in the European Union. Such a frequency range may cover multiple channels simultaneously. Additionally, the search module 302 may conduct a preliminary search for active channels of multiple different communication standards, but with overlapping frequency bands. For example, 802.11b and 802.11g both operate at 2.4 GHz. Therefore, the search module may search for 802.11b and 802.11g networks simultaneously.

In one embodiment, the search module 302 performs the preliminary search by enabling promiscuous mode on the transceiver. Alternate names for such a mode may exist such as monitor mode, sniff mode, and the like. In one embodiment, promiscuous mode collects all energy transmissions within the predefined frequency band.

In one embodiment, the investigation module 304 investigates the availability of the active communication channels identified during the preliminary search. In certain embodiments, investigation may include checking protocol standards, checking encryption requirements, checking security requirements, checking modulation schemes, and the like. In one embodiment, the investigation module 304 may additionally generate an order of priority for active communication channels to associate with.

In one embodiment, the association module 306 associates with the WAP 204 on an available active communication channel provided by the investigation module 304. In one embodiment, the association module 306 establishes a network connection between the client 202 and a WAP 204 by exchanging connection information with the WAP. For example, the association module 306 may establish synchronized clock signals, synchronized transmission rates, and the like. Additionally, the association module 306 may transmit passwords, encryption keys, and the like for secured networks.

Figure 4:
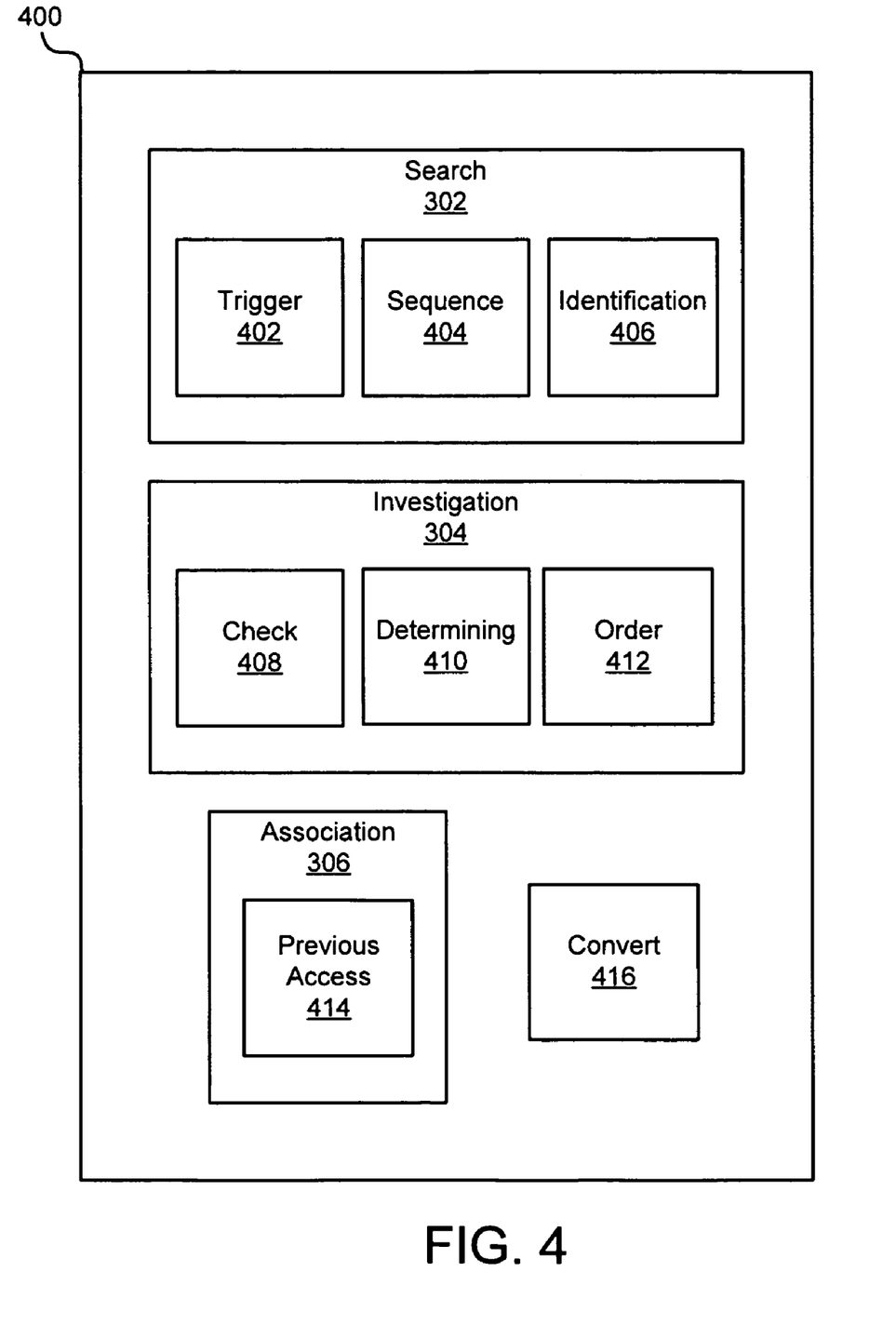
FIG. 4 is a detailed schematic block diagram illustrating one embodiment of an apparatus for rapid wireless network association.

FIG. 4 depicts a detailed schematic block diagram illustrating one embodiment of an apparatus 400 for rapid wireless network association. In one embodiment, the apparatus 400 includes the search module 302, investigation module 304, and association module 306 described in relation to FIG. 3. Additionally, the apparatus 400 may include a trigger module 402, a sequence module 404, an identification module 406, a check module 408, an order module 412, a determining module 410, a previous access module 414, and a convert module 416.

In one embodiment, the search module 302 includes a trigger module 402 configured to trigger a full band capture mode wherein the full band capture mode collects information that characterizes activity on a predefined frequency spectrum for any channel. In one embodiment, the trigger module 402 may enable promiscuous mode to conduct the full band search. Promiscuous mode is typically a standard feature of most wireless networking hardware. Other names for promiscuous mode may include capture mode, monitor mode, sniff mode, broadband mode, and the like. In one embodiment, promiscuous mode collects all network traffic between devices within range of the receiver on a predefined frequency band.

In one embodiment, the search module 302 additionally includes a sequence module 404. In one embodiment, the sequence module 404 is configured to determine a sequence to sequentially search a group of frequency spectra according to a predetermined priority policy. In one embodiment, determination of the priority policy may include factors such as data rates possible on various frequency bands, the last frequency band accessed, and the like. The priority policies may be stored in a storage device such as memory, cache, or register in communication with the apparatus 400.

The search module 302 may additionally include an identification module 406. In one embodiment, the identification module 406 identifies active communication channels within a plurality of digital data networking standards. In one embodiment, the identification module 406 identifies active communication channels by analyzing information collected during the course of the preliminary search. In one embodiment, the identification module 406 may recognize energy transmissions as a beacon signal emanating from a WAP 204. Alternatively, the identification module 406 may identify energy transmissions corresponding to digital data communication activities between other wireless network components. In one embodiment, the identification module 406 then stores a list of active channels for later investigation. In another embodiment, the identification module 406 may arrange the identified active channels in order of priority for the investigation module 304 to investigate.

In one embodiment, the investigation module 304 includes a check module 408 configured to check a communication channel identified as active by the search module 302 for energy associated with a WAP 204. In one embodiment, the check module 408, verifies that energy detected by the identification module 406 is actually associated with an active WAP 204 or other wireless network device. In one embodiment, the check module 408 may analyze digital data packets transmitted wirelessly to determine if active data communications are present on an identified communication channel. For example, the check module 408 may intercept a wireless data transmission broadcast by a wireless network device. The check module 408 may then demodulate the signal and read the first several bits of the message referred to as a packet header.

The investigation module 304 may additionally include a determining module 410 configured to determine a protocol supported by an active communication channel. In one embodiment, the determining module 410 analyzes the packet header information obtained by the check module 408 to determine the supported protocol. Alternative embodiments may exist, such as active protocol determination. In one embodiment, determination of the protocol may include determination of the IEEE standard required, determination of the data format, determination of encryption requirements, determination of security requirements, determination of the modulation scheme, and the like.

In one embodiment, the investigation module 304 may additionally include an order module 412 configured to queue active communication channels to associate with according to predefined criteria. For example, the predefined criteria may include maximum data rate possible, encryption type, signal strength level, and the like. In on embodiment, the order module 412 may use information derived by the check module 408 and the determining module 410 to queue the active communication channels. The order module 412 may use various queuing schemes recognizable by one with ordinary skill in the art.

In one embodiment, the association module 306 may additionally include a previous access module 414 configured to attempt association with a previously accessed WAP 204 prior to associating with any other WAPs 204. In one embodiment, the attempt is made within a predefined time interval. In one embodiment, the predefined time interval may be several seconds. Alternatively the predetermined time interval may be one or more minutes. The previous access module 414 may trigger the association module 306 to attempt the association with the previously accessed WAP 204 prior to the preliminary full band search and the investigation operations.

For example, if a client 202 was connected to a WAP 204 within a three minute time period, but the connection was lost, the previous access module 414 may override the search module 302 and the investigation module 304 by triggering the association module 306 to attempt to re-associate with the previously accessed WAP 204 prior to the full band search and the investigation. Alternatively, the previous access module 414 may allow the association module 306 to attempt association with the previously accessed WAP 204 while the full band search and investigation processes are in progress.

In one embodiment, the apparatus 400 includes a convert module 416 configured to convert to standard scanning mode subsequent to either successful WAP 204 association, or failure to associate with a WAP 204 on communication channels identified by the search module 302. In one embodiment, the convert module 416, converts by disabling promiscuous mode, and enabling a standard passive channel scan mode. The standard channel scan mode may scan channel by channel for an active data communication network.

Figure 5:
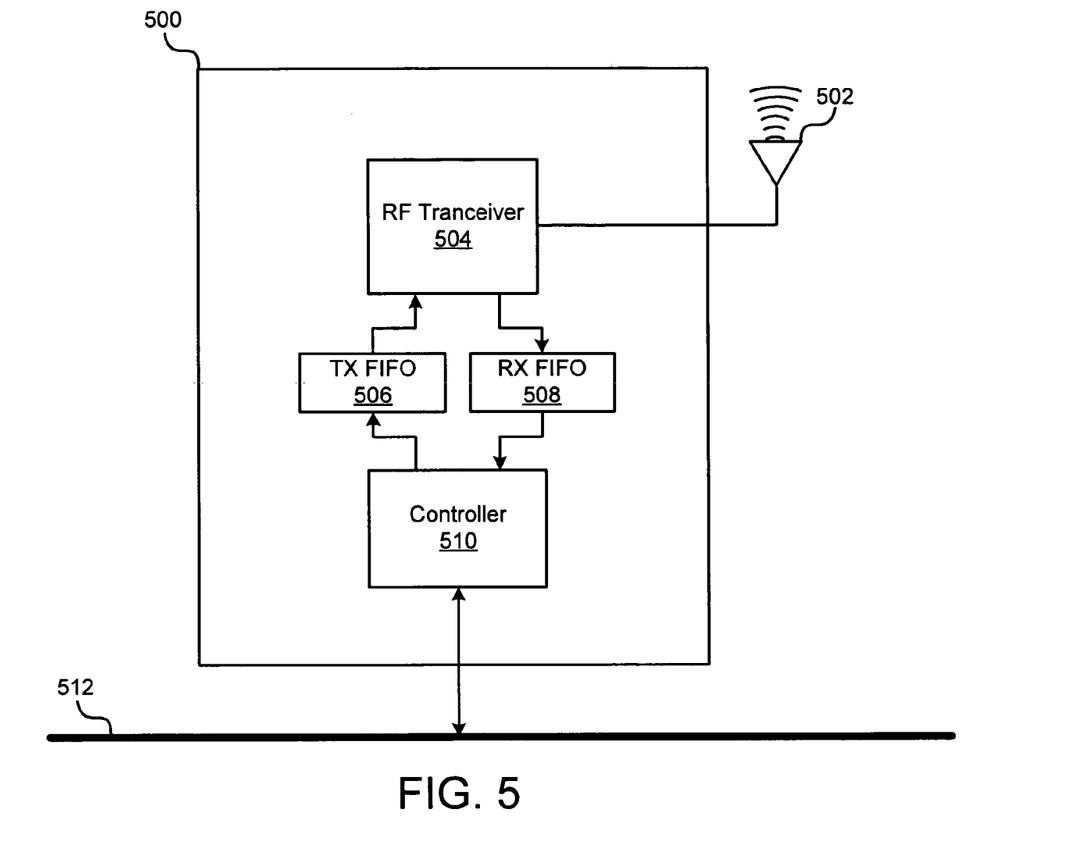
FIG. 5 is a schematic block diagram illustrating a wireless networking card configuration.

FIG. 5 depicts a schematic block diagram illustrating one embodiment of a wireless networking card 500. In one embodiment, the card includes a controller 510, a transmit First In First Out (FIFO) buffer 506, a receive FIFO buffer 508, and an RF transceiver 504. Additionally, the card may be coupled to an RF antenna 502, and a wired communication line 512.

In one embodiment, the antenna 502 may be external to the card 500 and coupled to the card 500 by an RF transmission line cable. In one embodiment, the cable is a coaxial cable. Alternatively, the antenna may be coupled directly to electrical contacts on the card 500. In another alternative embodiment, the antenna 502 may be coupled to the card 500 by microstrip transmission lines.

In one embodiment, the RF transceiver 504 includes transmit and receive RF filters, mixers, oscillators, multiplexors, diplexors, polarizers, and the like. The transceiver 504 may additionally include components for modulation, encryption, and the like.

In one embodiment, the transmit FIFO buffer 506 and the receive FIFO buffer 508 are used to regulate the rate of data transmission without losing data. For example, data may enter the card 500 at the data rate of a PCI bus 512. If the data rate on the bus 512 is higher than that of the wireless network connection, data may be lost without the FIFO buffer 506. The FIFO buffers 506, 508 serve as a holding bin for data that has not yet been transmitted wirelessly, or picked up on the wired connection 512.

In one embodiment, the controller 510 includes the modules of the apparatus 300, 400 for rapid network association. Additionally, the controller 510 may include components for data handling, data modulation, data encryption, standard channel scanning procedures, and the like.

In one embodiment, the wireless card 500 is coupled to a data connection 512. In certain embodiments, the data connection 512 is a wired network connection such as a category 5, coaxial, or fiber optic cable. Such cables 512 may be used to establish an Ethernet LAN connection, a cable transmission network connection, a Digital Subscriber Line (DSL) data connection, a T-1 data connection, etc. Alternatively, the data connection 512 may represent an internal data bus such as a Peripheral Component Interconnect (PCI) data bus, PCMCIA data bus, or the like. In another alternative embodiment, the data connection 512 may be another wireless network connection.

Figure 6:
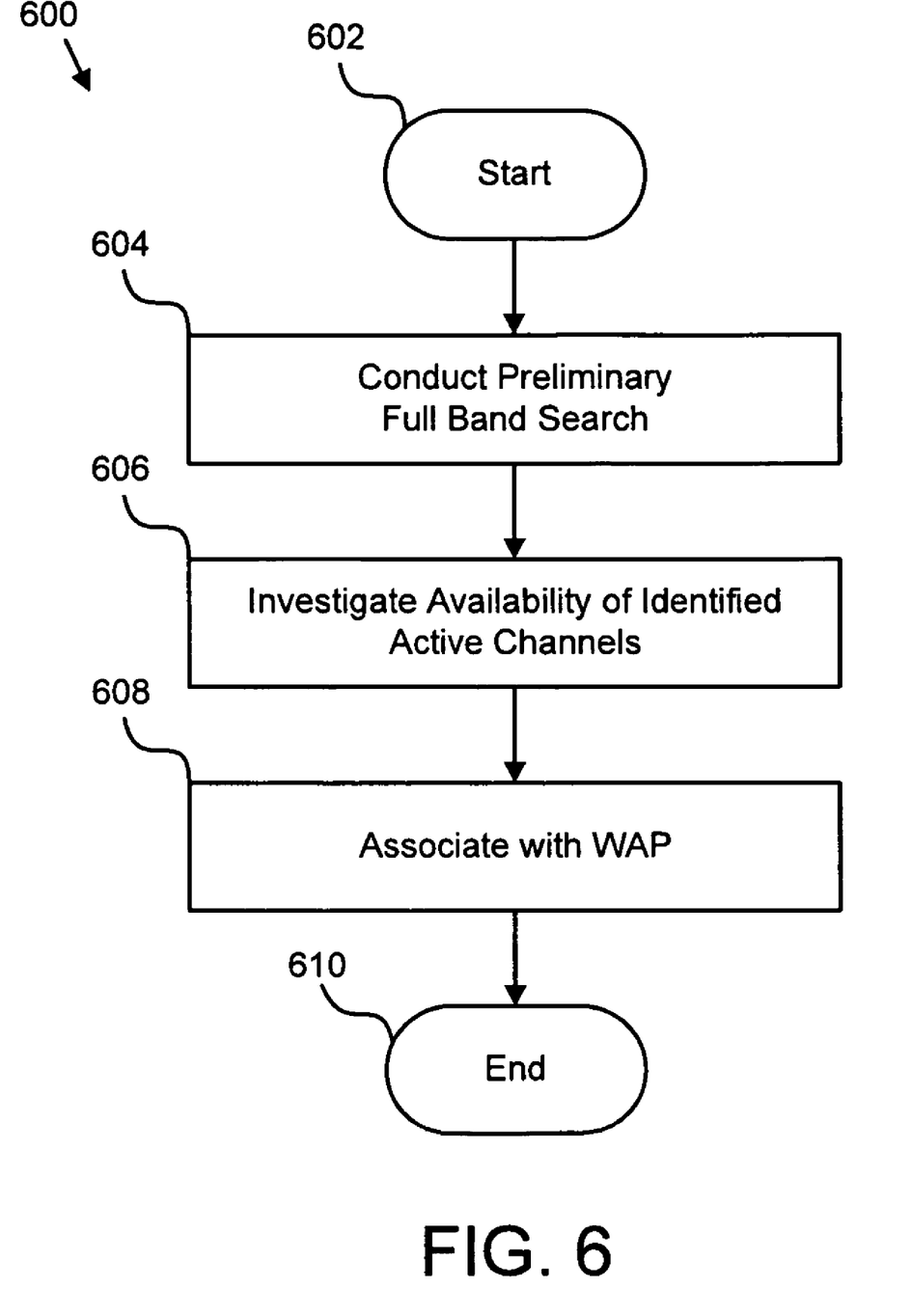
FIG. 6 is a schematic flow chart diagram illustrating a method for rapid wireless network association.

FIG. 6 depicts a schematic flow chart diagram illustrating one embodiment of a method 600 for rapid wireless network association. In one embodiment, the method 600 starts 602 when the search module 302 conducts a preliminary full band search 604 on a predefined frequency spectrum. Next, the investigation module 304 investigates 606 the availability of active data communication channels identified during the preliminary full band search 604. The association module 306 then attempts to associate 608 with a WAP 204 on an active data communication channel, and the method 600 ends 610.

Figure 7:
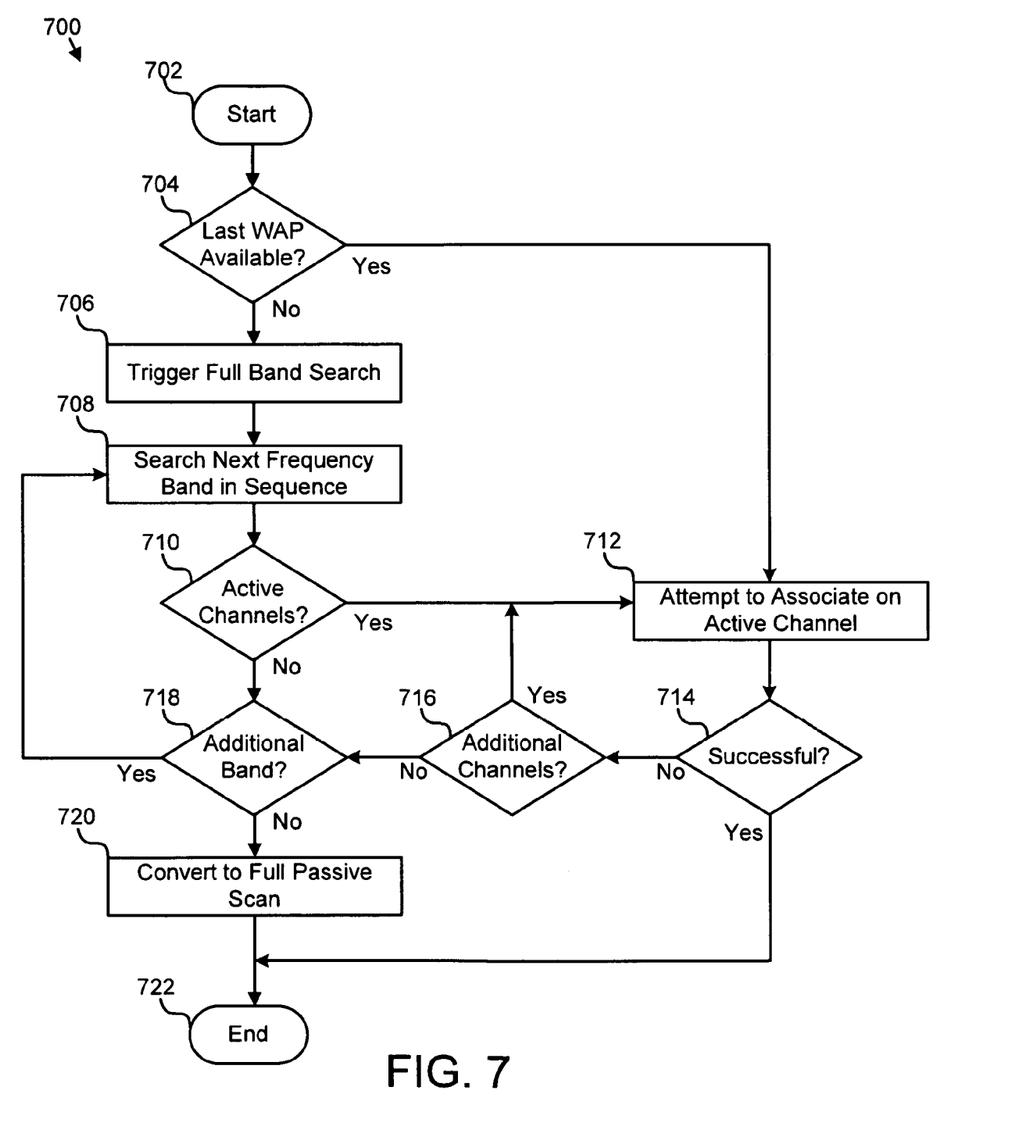
FIG. 7 is a detailed schematic flow chart diagram illustrating a method for rapid wireless network association.

FIG. 7 depicts a detailed schematic flow chart diagram illustrating one embodiment of a method 700 for rapid wireless network association. In one embodiment, the method 700 starts 702 when the previous access module 414 determines 704 whether the WAP 204 last accessed is still available. In one embodiment, the determination 704 may also be based on the time elapsed since the last access to the WAP 204. If the previously accessed WAP 204 is still available 704, then the association module 306 attempts 712 to associate on the previously accessed data communication channel. If the previously accessed WAP 204 is not available 704, the trigger module 402 triggers 706 a preliminary full band search.

In one embodiment, the search module 302 then searches 708 the next frequency band in the sequence, as defined by the sequence module 404. Next the identification module 406 determines 710 if any active channels are present on the frequency band being searched. If active channels are present the association module 306 attempts to associate 712 with a WAP 204 on the active data communication channel. If there are no active data communication channels present on the frequency band, the search module 302 determines 718 if additional frequency bands can be searched 708.

Next, the method 700 determines 714 if an attempt to associate with a WAP 204 on an active communication channel are successful. If so, the method 700 ends 722. If not, the association module 306 checks 716 for additional active channels identified by the determining module 410 and sequentially ordered by the order module 412. If additional channels are active, the association module 306 may make another attempt 712 to associate with the network on one of the additional channels. This loop may continue until no additional active channels are present on the frequency band. If no additional active channels are present on the band, the search module 302 checks 718 for additional bands to search.

If additional frequency bands can be searched 708, the search module 302 conducts the preliminary full band search 708 on the next frequency band in the sequence defined by the sequence module 404. If no additional frequency bands exist, the convert module 416 converts 720 an operation mode in one embodiment to standard passive channel scan, and the method 700 ends 722.

Figure 8:
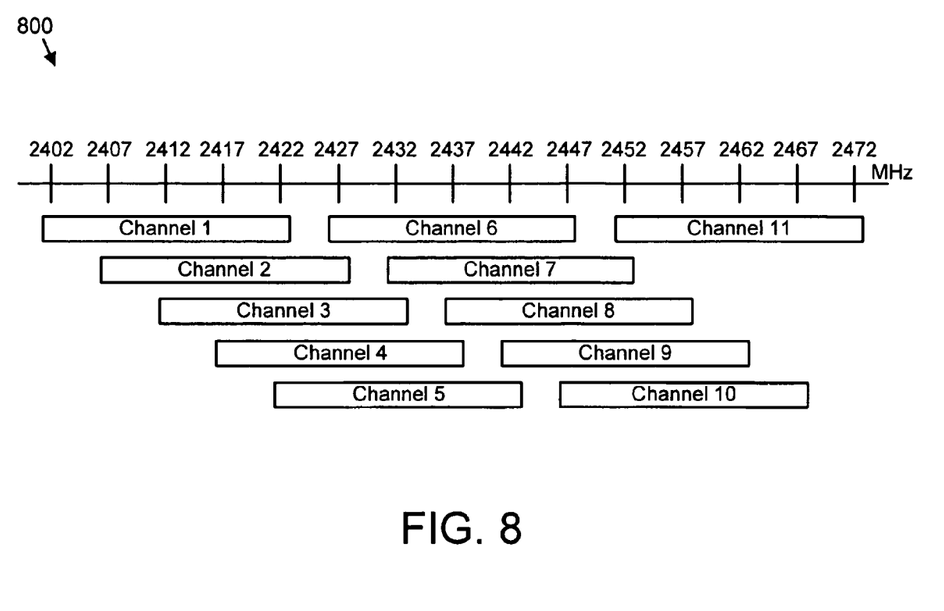
FIG. 8 is a conceptual drawing illustrating one embodiment of channel allocation within a frequency band.

FIG. 8 depicts a conceptual drawing illustrating one embodiment of channel allocation within a frequency band 800. In one embodiment, the frequency band may be divided into channels. For purposes of illustration, the frequency band 800 has been labeled with frequencies associated with the IEEE 802.11b standard. The frequency band 800 may also be referred to as a frequency spectrum. In one embodiment, the frequency band of IEEE 802.11b may include 11 channels. Certain channels such as channel 1 and channel 2 may have overlapping frequencies. Other channels such as channel 1, channel 6, and channel 11 may have non overlapping frequencies. Although, eleven channels associated with frequency allocations of the IEEE 802.11b standard for the United States have been depicted, other frequency bands, channel allocations, and associated standards may be illustrated in a similar accord.

The disclosed embodiments enable one of ordinary skill in the art to substantially create an apparatus, system, and method for rapid wireless network association. Beneficially such an apparatus, system, and method provide for more efficient searching, scanning, and association than typically found in the art.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for rapid wireless network association, the apparatus comprising:
   a receiving antenna configured to simultaneously receive radio frequency (RF) energy signals across a plurality of channels of a predefined frequency spectrum;
   a search module configured to simultaneously capture information about the RF energy signals across the plurality of channels spectrum to identify one or more active communication channels;
   an investigation module configured to sequentially investigate the availability of only the identified active communication channels until an available active communication channel is discovered; and
   an association module configured to associate with a wireless access point on the available active communication channel.

2. The apparatus of claim 1, further comprising a previous access module configured to attempt association with a previously accessed wireless access point prior to attempting associations with any other wireless access points, wherein the attempt is made within a predetermined time interval.

3. The apparatus of claim 1, wherein the search module further comprises a trigger module configured to trigger a broadband capture mode, such that the search module collects information that characterizes activity on the predefined frequency spectrum.

4. The apparatus of claim 1, wherein the search module further comprises a sequence module configured to sequentially search a plurality of predefined frequency spectra, the sequence determined by a predetermined priority policy.

5. The apparatus of claim 1, wherein the search module further comprises an identification module configured to identify active communication channels characterized by a plurality of digital data networking standards.

6. The apparatus of claim 1, wherein the investigation module further comprises a check module configured to check a communication channel identified as active by the search module for energy associated with a wireless access point.

7. The apparatus of claim 1, wherein the investigation module further comprises an order module configured to sequentially order active communication channel candidates according to predefined criteria.

8. The apparatus of claim 1, wherein the investigation module further comprises a determining module configured to determine a protocol supported by an active communication channel.

9. The apparatus of claim 1, further comprising a convert module configured to convert the investigation module and the association module to operate according to standard scanning mode subsequent to a condition selected from a group consisting of successful wireless access point association and failure to associate with a wireless access point on communication channels identified by the search module.

10. An apparatus for rapid wireless network association, the apparatus comprising:
    a first wireless network device comprising:
      a receiving antenna configured to simultaneously receive radio frequency (RF) energy signals across a plurality of channels of a predefined frequency spectrum;
      a search module configured to simultaneously capture information about the RF energy signals across a the plurality of channels to identify one or more active communication channels;
      an investigation module configured to sequentially investigate the availability of only the identified active communication channels until an available active communication channel is discovered; and
      an association module configured to associate with a wireless network device on the available active communication channel; and a second wireless network device comprising:
- a transmit module configured to transmit energy that can be detected by the receiving antenna across a plurality of channels on a predefined frequency spectrum;
- a receive module configured to receive an association request from the first wireless network device; and
- an association module configured to associate with the first wireless network device on an available active communication channel in response to the association request.

11. A system for rapid wireless network association, the system comprising:
- a wireless access point configured for wireless network connections; and
- a wireless network client configured to:
  - enable operation of a receiving antenna configured to simultaneously receive radio frequency (RF) energy signals across a plurality of channels of a predefined frequency spectrum;
  - enable operation according to promiscuous mode to simultaneously capture information about the RF energy signals across the plurality of channels to identify one or more active communication channels;
  - sequentially investigate the availability of only the identified active communication channels until an available active communication channel is discovered; and
  - associate with the wireless access point on the available active communication channel.

12. The system of claim 11, wherein the wireless network client is further configured to attempt association with a previously accessed wireless access point prior to attempting association with any other wireless access points, wherein the attempt is made within a predetermined time interval.

13. The system of claim 12, wherein the wireless network client is further configured to trigger a broadband capture mode, such that the search module collects information that characterizes activity on the predefined frequency spectrum.

14. The system of claim 13, wherein the wireless network client is further configured to sequentially search a plurality of predefined frequency spectra, the sequence determined by a predetermined priority policy.

15. The system of claim 14, wherein the wireless network client is further configured to identify active communication channels characterized by a plurality of digital data networking standards and overlapping frequencies.

16. The system of claim 15, wherein the wireless network client is further configured to check a communication channel identified as active by the search for energy associated with a wireless access point.

17. The system of claim 16, wherein the wireless network client is further configured to order active communication channel candidates according to predefined criteria.

18. The system of claim 17, wherein the wireless network client is further configured to determine a protocol supported by an active communication channel.

19. The system of claim 18, wherein the wireless network client is further configured to convert the client to operate according to standard scanning mode subsequent to a condition selected from a group consisting of successful wireless access point association and failure to associate with a wireless access point on communication channels identified by the client.

20. A method for rapid wireless network association, the method comprising:
- a receiving antenna configured to simultaneously receive radio frequency (RF) energy signals across a plurality of channels of a first predefined frequency spectrum and to receive radio frequency (RF) energy signals simultaneously across a plurality of channels of a second predefined frequency spectrum;
- simultaneously capturing information about the RF energy signals across the plurality of channels of the first predefined frequency spectrum and simultaneously capturing information about the RF energy signals across the plurality of channels of the second predefined frequency spectrum to identify one or more active communication channels;
- sequentially investigating the availability of only the identified active communication channels of the first predefined frequency spectrum until an available active communication channel is discovered;
- associating with a wireless access point on the available active communication channel in the first predefined frequency spectrum;
- sequentially investigating the availability of only the identified active communication channels of the second predefined frequency spectrum in response to failing to discover an available active communication channel on the first predefined frequency spectrum until an available active communication channel is discovered; and
- associating with a wireless access point on the available active communication channel in the second predefined frequency spectrum.

21. An apparatus for rapid wireless network association, the apparatus comprising:
- a means for simultaneously receiving radio frequency (RF) energy signals across a plurality of channels of a predefined frequency spectrum;
- means for simultaneously capturing information about the RF energy signals across the plurality of channels to identify one or more active communication channels;
- means for sequentially investigating the availability of only the identified active communication channels until an available active communication channel is discovered; and
- means for associating with a wireless access point on the available active communication channel.

* * * * *